United States Patent

Kaji et al.

[11] Patent Number: 5,443,040
[45] Date of Patent: Aug. 22, 1995

[54] PIPESTILL HEATER AND METHOD FOR CONTROLLING COMBUSTION IN PIPESTILL HEATER

[75] Inventors: Hitoshi Kaji; Toshiaki Yoshioka, both of Kanagawa, Japan

[73] Assignee: Chiyoda Corporation, Yokohama, Japan

[21] Appl. No.: 365,409

[22] Filed: Dec. 28, 1994

[30] Foreign Application Priority Data

Dec. 28, 1993 [JP] Japan ................................ 5-337861
Dec. 20, 1994 [JP] Japan ................................ 6-316741

[51] Int. Cl.$^6$ ............................................. F22B 5/00
[52] U.S. Cl. ....................... 122/13.1; 122/367.1; 126/91 A; 431/215; 165/4; 165/9.3; 432/180; 432/181
[58] Field of Search ................. 431/215, 170; 122/367.1, 367.3, 13 R, 18, 19; 165/4, 9.3; 432/179–181; 126/91 A, 344, 361, 374, 373

[56] References Cited

U.S. PATENT DOCUMENTS

| | | | |
|---|---|---|---|
| 4,392,818 | 7/1983 | Wunning | 431/215 |
| 4,856,492 | 8/1989 | Kawamoto | . |
| 4,926,842 | 5/1990 | Watson | 432/181 |
| 5,275,556 | 1/1994 | Hirose | 432/181 |

FOREIGN PATENT DOCUMENTS

| | | |
|---|---|---|
| 0526172A2 | 2/1993 | European Pat. Off. . |
| 1-159511 | 6/1989 | Japan . |
| 1-222102 | 9/1989 | Japan . |
| 5-256423 | 10/1993 | Japan . |
| 2208423A | 3/1989 | United Kingdom . |

*Primary Examiner*—James C. Yeung
*Attorney, Agent, or Firm*—Armstrong, Westerman Hattori, McLeland & Naughton

[57] ABSTRACT

A pipestill heater capable of increasing heat efficiency without using a large-sized oxidizing agent heating unit. The pipestill heater includes a radiation section and a convection section for preheating process fluid by exhaust gas of an elevated temperature discharged through a gas discharge path. A combustion device including a combination of a burner and a heat exchanger is arranged on a furnace floor constituting a part of a furnace wall. The heat exchanger includes a regenerator heated by exhaust gas to heat an oxidizing agent and a duct structure including an oxidizing agent passage and an exhaust passage. The regenerator is rotated relative to both passages. Exhaust gas is guided through both a gas discharge path and an exhaust passage.

20 Claims, 5 Drawing Sheets

PIPESTILL HEATER AND METHOD FOR CONTROLLING COMBUSTION IN PIPESTILL HEATER

BACKGROUND OF THE INVENTION

This invention relates to a pipestill heater and a method for controlling combustion in a pipestill heater, and more particularly to a pipestill heater including a convection section and a radiation section for preheating process fluid by means of exhaust gas discharged from combustion devices and a method for controlling combustion in such a pipestill heater.

A conventional pipestill heater is generally constructed in such a manner as shown in FIGS. 6(A) and 6(B). More particularly, the pipestill heater includes a casing 100 made of a steel plate in which a radiation section 101 and a convection section 102 are provided. The radiation section 101 includes a furnace floor 103 constituting a part of a furnace wall, on which a plurality of combustion devices 104 are mounted. Also, the radiation section 101 is provided therein with a heating tube path 105 adapted to be heated by radiative heat transfer from the combustion devices 104. The heating tube path 105 is typically formed of a plurality of vertically extending straight tubes 106 wherein each adjacent two of the tubes 106 are connected at each of upper and lower ends thereof in series to each other by means of a U-shaped tube. The convection section 102 is arranged on a downstream side of a discharge flow path for exhaust gas discharged from the radiation section 101 and provided therein with a preheating tube path 107 connected to the heating tube path 105. Process fluid flowing through the preheating tube path 107 is preheated by exhaust gas of an elevated temperature discharged from the combustion devices before it is fed to the heating tube path 105. The preheating tube path 107 is likewise formed of a plurality of straight tubes wherein each adjacent two of the tubes are connected at each of both ends thereof in series to each other by means of a U-shaped tube. Exhaust gas discharged from the convection section 102 is guided to an intermediate flow path through a gas discharge path 109 provided with an induced draft fan 108. Alternatively, the exhaust gas may be naturally discharged without the induced draft fan 108. The combustion devices 104 each are so constructed that combustion air is fed to a burner 104b through a duct 104a equipped with a flow control damper by means of a forced draft fan. Alternatively, feeding of the combustion air may be carried out by a natural draft action without using the forced draft fan.

Heat efficiency exhibited by the conventional pipestill heater thus constructed is generally limited to a level as low as 60 to 85%. In order to increase the heat efficiency to a level as high as 90% or more, it is required to arrange an oxidizing agent preheating unit for preheating an oxidizing agent such as combustion air or the like. Unfortunately, this not only requires a large space for the arrangement but causes a cost for construction of the preheating unit to be increased to a level as high as that for a heater body. This is likewise true of replacement of the preheating unit deteriorated in performance. Also, it is demanded to install an equipment for pollution prevention attendant on arrangement of the heater. However, any existing pipestill heater generally fails to have a sufficient space which permits such a pollution prevention equipment to be added thereto.

SUMMARY OF THE INVENTION

The present invention has been made in view of the foregoing disadvantage of the prior art.

Accordingly, it is an object of the present invention to provide a pipestill heater which is capable of significantly increasing heat efficiency without any large-sized oxidizing agent preheating unit.

It is another object of the present invention to provide a pipestill heater which is capable of reducing a space for installing an ancillary equipment, to thereby increase heat efficiency.

It is a further object of the present invention to provide a method for controlling combustion in a pipestill heater which is capable of permitting heat efficiency to be significantly increased without any large-sized oxidizing agent preheating unit.

It is still another object of the present invention to provide a method for controlling combustion in a pipestill heater which is capable of increasing heat efficiency while reducing a space for installing an ancillary equipment.

In accordance with one aspect of the present invention, there is provided a method for controlling combustion in a pipestill heater including a radiation section including a furnace wall and arranged for heating process fluid flowing through a heating tube path arranged therein mainly by radiative heat transfer, at least one combustion device arranged on the furnace wall of the radiation section, a convention section having a preheating tube path arranged therein and connected to the heating tube path for preheating the process fluid flowing through the preheating tube path by exhaust gas discharged from the combustion device, and a gas discharge path for discharging exhaust gas passing through the convection section. The method comprises the step of using a heat recovery type combustion apparatus as said combustion device. The heat recovery type combustion apparatus includes a heat exchanger and a burner. The heat exchanger includes at least one air-pervious regenerator, an oxidizing agent passage for feeding an oxidizing agent through at least a part of the regenerator to the radiation section, and an exhaust passage for discharging a part of exhaust gas discharged from the radiation section through at least a part of the regenerator, to thereby heat the regenerator by a part of the exhaust gas, resulting in preheating the oxidizing agent by the regenerator thus heated. The methods also comprises the steps of flowing the exhaust gas through both the gas discharge path and exhaust passage and determining a ratio between the amount of exhaust gas flowing through the gas discharge path and the amount of exhaust gas flowing through the exhaust passage of the combustion device so that a maximum tube wall temperature of the heating tube path is below a heating tube design temperature.

In the present invention, such a combustion device as disclosed in each of U.S. Pat. No. 4,856,492, European Patent Application Publication No. 526,172A2, British Patent Application Publication 2,208,423A, Japanese Patent Application Laid-Open Publication No. 159511/1989, Japanese Patent Application Laid-Open Publication No. 222102/1989, Japanese Patent Application Laid-Open Publication No. 256423/1993 or the like may be used as the heat recovery combustion apparatus.

The words "heating tube design temperature" used herein indicate an allowable maximum temperature of a surface of the heating tube which is determined on a design stage of a heater depending on a material of the heating tube, a heated temperature of the process fluid and the like. The maximum tube wall temperature is a maximum temperature appearing on a wall of the heating tube path and is normally measured at an outlet of the heating tube path. The above-described ratio is varied depending on a ratio between a heat transfer area of the radiation section and that of a convection section, specifications of the regenerator such as an effective surface area of the regenerator, an opening ratio thereof, a thermal capacity thereof and the like, and a heat transfer area of the regenerator.

The words "oxidizing agent" used herein generally indicate gas containing molecular oxygen such as pure oxygen, air oxygen enriched air or the like. However, any suitable oxidizing substances such as halogen, nitrogen oxide and the like other than the above may be used depending on applications.

In accordance with another aspect of the present invention, a pipestill heater is provided which includes a radiation section including a furnace wall and arranged for heating process fluid flowing through a heating tube path arranged therein mainly by radiative heat transfer, at least one combustion device arranged on the furnace wall of the radiation section, a convection section having a preheating tube path arranged therein and connected to the heating tube path for preheating the process fluid flowing through the preheating tube path by exhaust gas discharged from the combustion device, and a gas discharge path for discharging the exhaust gas passing through the convection section.

In the present invention, the pipestill heater is featured in that the combustion device including a heat recovery type combustion apparatus constructed of a combination of a burner and a heat exchanger for preheating an oxidizing agent fed to the burner by means of exhaust gas.

The heat exchanger includes at least one air-pervious regenerator, an oxidizing agent passage for feeding an oxidizing agent through at least a part of the regenerator to the radiation section, and an exhaust passage for discharging a part of exhaust gas discharged from the radiation section through at least a part of the regenerator and constructed so as to heat the regenerator by a part of the exhaust gas, to thereby preheat the oxidizing agent by the regenerator thus heated. The pipestill heater also includes a fan unit for flowing the oxidizing agent through the oxidizing agent passage and flowing exhaust gas through both the gas discharge path and the exhaust passage of the combustion device. The fan unit determines a ratio between the amount of exhaust gas flowing through the gas discharge path and the amount of exhaust gas flowing through the exhaust passage of the combustion device so that a maximum tube wall temperature of the heating tube path is below a heating tube design temperature.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, in which like reference numerals generally designate like or corresponding parts throughout; wherein.

DETAILED DESCRIPTION OF THE PREFERRED EMBODIMENTS

Now, the present invention will be described hereinafter with reference to the accompanying drawings.

Figure 1:
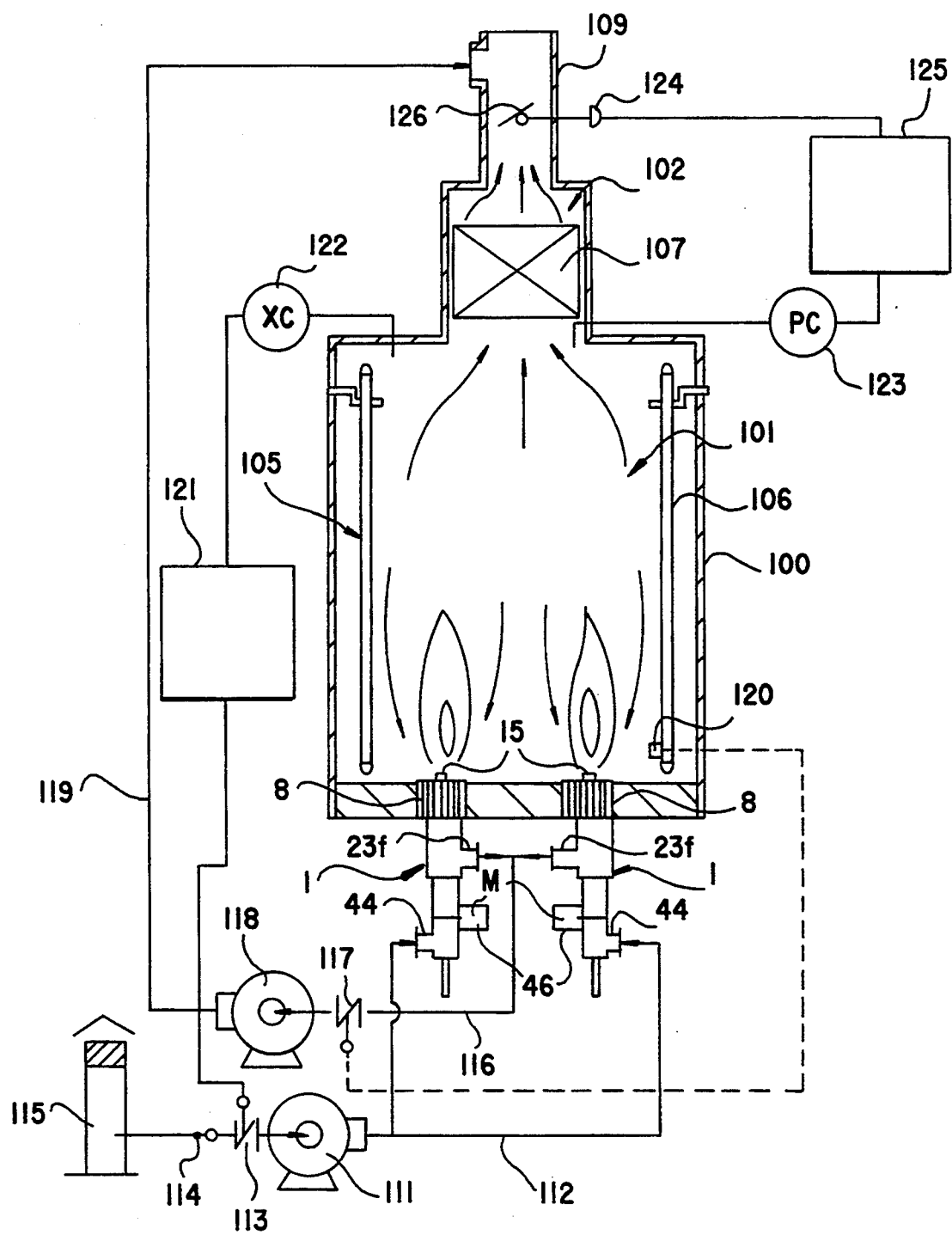
FIG. 1 is a schematic sectional view showing an embodiment of a pipestill heater according to the present invention.
Figure 2:
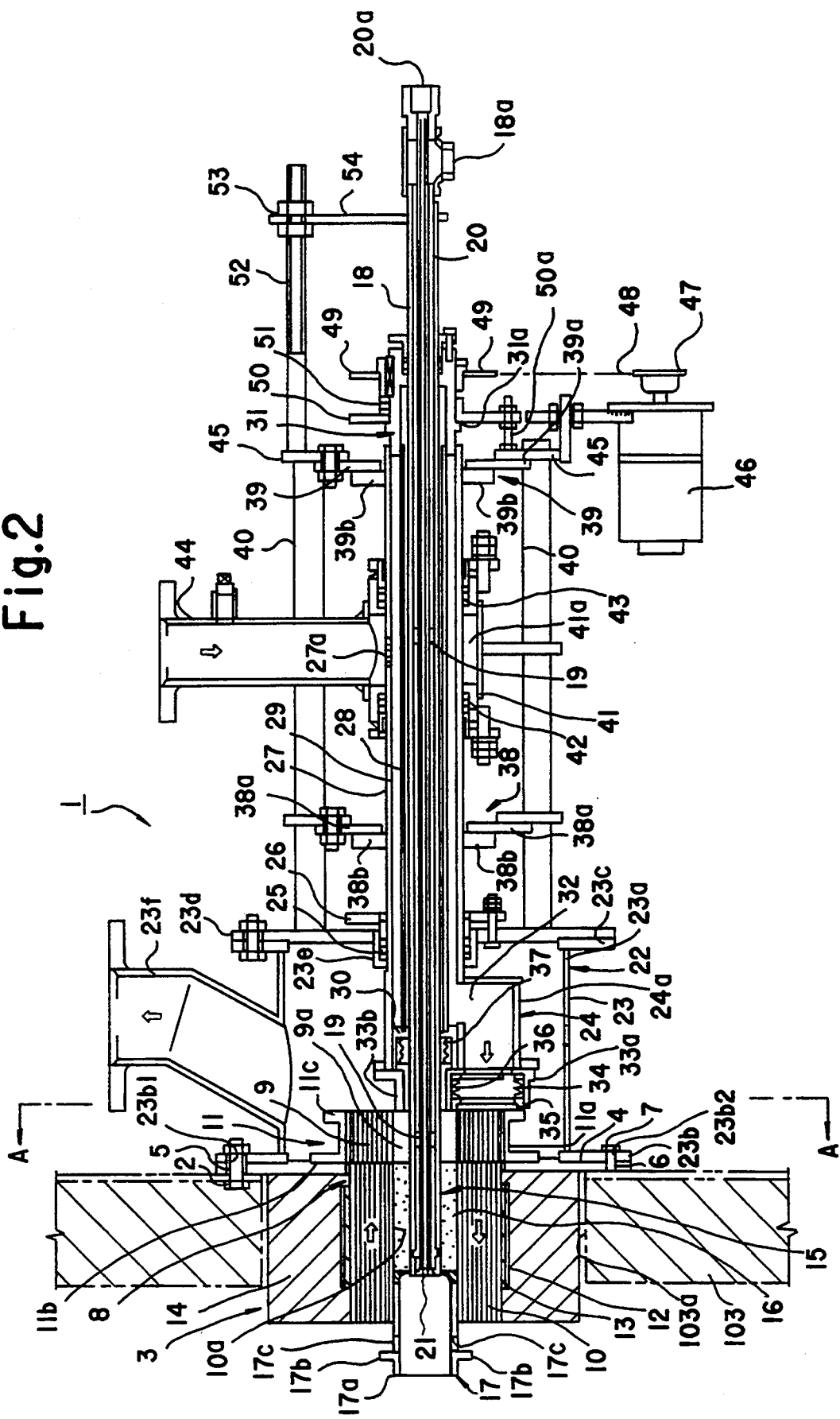
FIG. 2 is a sectional view showing an example of a combustion device.
Figure 3:
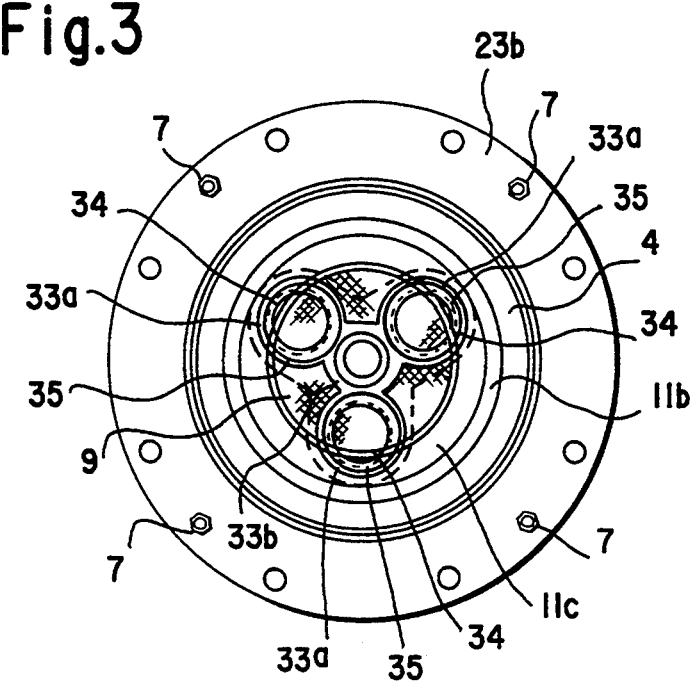
FIG. 3 is a sectional view taken along line A—A of FIG. 2.

Referring first to FIGS. 1 to 3, an embodiment of a pipestill heater according to the present invention is illustrated, wherein FIG. 1 schematically shows application of the present invention to the existing pipestill heater and FIGS. 2 and 3 show a combustion device in the form of a heat recovery type combustion apparatus including a heat exchanger and a burner constructed integrally with each other. A pipestill heater of the illustrated embodiment is constructed in a manner different in combustion devices and a fan unit from the above-described conventional pipestill heater. First, combustion devices will be described by way of example.

In FIGS. 2, reference numeral 103 designates a furnace floor constituting a part of a furnace wall of a pipestill heater of the illustrated embodiment, which is formed with a mounting opening 103a through which a heat exchanger 3 of each of combustion devices 1 is mounted on the furnace floor 103. The furnace floor 103 has a plurality of mounting bolts 2 embedded therein at predetermined intervals in a circumferential direction thereof in a manner to surround the mounting opening 103a. The mounting bolts 2 are mounted thereon with a mounting plate 4 through a plurality of through-holes 5 formed therethrough. The mounting plate 4 is made of metal and fittedly mounted with the heat exchanger 3. Also, the mounting plate 4 is formed into an annular shape and provided with a plurality of threaded holes 5 together with the above-described through-holes 5 in a manner to be positioned in proximity to an outer periphery thereof and spaced from each other at predetermined intervals in the circumferential direction. In each of the threaded holes 6 is threadedly fitted a bolt 7 for fixing a suction/exhaust duct structure 22.

The mounting plate 4 is fixedly mounted on a surface thereof facing the suction/exhaust duct structure 22 with a fixture 11 by means of a fixing means (not shown) which may comprise a combination of a bolt and a nut. The fixture 11 is made of metal and functions to fix a regenerative unit 9 constituting a low-temperature block or section of a regenerator 8 on the mounting plate 4 therethrough. Also, the mounting plate 4 is fixedly mounted on a surface thereof facing a radiation section with a fixture 12 by means of a fixing means (not shown) which may likewise comprise a combination of a bolt and a nut. The fixture 11 is made of metal and functions to fix a regenerative unit 10 constituting a high-temperature block or section of the regenerator 8 on the mounting plate 4 therethrough. The fixture 11 includes a cylindrical portion 11a and flange portions 11b and 11c provided on either side of the cylindrical portion 11a. The flange portion 11b is formed with a plurality of through-holes (not shown) via which bolts are inserted. The flange portion 11c has an outer end formed so as to have a surface smooth sufficiently to provide a seal section due to contact with a seal member described hereinafter. The fixture 12 includes a cylindrical ring portion which is provided on an outer periphery thereof with a plurality of mounting elements (not shown) formed with a plurality of holes through which bolts are inserted. Into the mounting elements are inserted bolts each having one end welded to the mounting plate 4, which are threadedly fitted on nuts, to thereby fix the fixture 12 on the mounting plate 4.

In the illustrated embodiment, the regenerative unit 9 constituting the low-temperature block is made of a metal material. More particularly, the regenerative unit 9 is formed into an annular shape by winding a laminate comprising flat strip-like steel plates and corrugated strip-like steel plates superposed on each other on a cylindrical spool 9a.

The regenerative unit 10 constituting the high-temperature block includes a ceramic regenerative body made by winding a laminate of strip-like ceramic paper sheets and strip-like corrugated ceramic paper sheets on a cylindrical spool to form a green body and then subjecting it to calcination. Alternatively, the ceramic regenerative unit 10 may be formed by extrusion molding known in the art. The regenerative unit 10 is formed at a central portion thereof with an axially extending through-hole 10a of substantially the same diameter as an outer diameter of the spool 9a. Also, the regenerative unit 10 is formed with a plurality of through-holes, which form a part of a plurality of communication paths of the regenerative unit 10. The through-holes are formed into substantially U-like and inverted U-like shapes or substantially triangular and inverted triangular shapes in cross section in an alternate manner in a circumferential direction of the regenerative unit 10, respectively.

Reference numeral 13 designates a cushioning member 13 made of a heat-resistant and thermally expandable ceramic-fiber composite material and arranged between an outer periphery of the regenerative unit 10 and the fixture 12, to thereby prevent damage to the regenerative unit 10 during fixing of the regenerative unit 10 on the fixture 12. In the illustrated embodiment, the mounting plate 4, the cushioning member 13 and the parts arranged between the plate 4 and the cushioning member 13 cooperate with each other to form a regenerative structure.

The regenerative unit 10 and fixture 12 are commonly provided on an outer periphery thereof with a refractory member 14 made of a ceramic fiber material or a castable material. The central through-hole of the spool 9a of the regenerative unit 9 and the through-hole 10a of the regenerative unit 10 are commonly provided therein with a cylinder 16 made of a ceramic fiber material, in which a burner nozzle 15 is inserted at a distal end thereof in such a manner that a slight gap which permits movement of the burner nozzle 15 in an axial direction thereof is defined therebetween. The cylinder 16 is mounted on a distal end thereof with a burner hood 17 made of a ceramic material. The burner hood 17 functions to stabilize a flame injected from the distal end of the burner nozzle 15 to prevent it from returning directly to the regenerative unit 10. The burner hood 17 includes a cylindrical portion 178a and an annular collar 17b formed on the cylindrical portion 17 in a manner to be radially outwardly projected therefrom and extend in a circumferential direction thereof. Also, the burner hood 17 is provided with a plurality of through-holes 17c, which are arranged in a manner to be spaced from each other in a peripheral direction of the burner hood 17 between the collar 17b and the regenerative unit 10.

The burner nozzle 15 includes a fuel pipe 18 in which a motive oxidizing agent pipe 20 is arranged through a spacer 19 in a manner to be concentric with the fuel pipe 18 and which is mounted on a distal or forward end thereof with a burner tip 21. The fuel pipe 18 is provided at a rear end thereof with a fuel inlet 18a and the motive oxidizing agent pipe 20 is provided at a rear end thereof with a motive oxidizing agent inlet 20a. The motive oxidizing pipe 20a is fed with an oxidizing agent. Also it may be fed with steam.

The mounting plate 4 is mounted thereon with the suction/exhaust duct structure 22. The suction/exhaust duct structure 22 includes an exhaust duct 23 and an oxidizing agent duct 24 rotatably arranged in an internal space defined in the exhaust duct 23. The exhaust duct 23 includes a duct body 23a of a cylindrical shape and flanges 23b and 23c provided on either side of the duct body 23a. The flange 23b is formed with a plurality of through-holes 23b1 through which the mounting bolts 2 extending through the mounting plate 4 are inserted and a plurality of through-holes 23b2 which are formed in alignment with the threaded holes 6 of the mounting plate 4 and through which the bolts 7 are inserted. The flange 23c has an end plate 23d fixed thereon by means of bolts. The end plate 23d is formed at a central portion thereof with a packing receiving portion 23e for receiving a gland packing 25 therein. Reference numeral 26 designates a packing holding plate for holding the gland packing 25 in the packing receiving portion 23e. The plate 26 is bolted to the end plate 23d. The duct body 23a is provided with an exhaust outlet 23f.

Reference numeral 27 designates an outer nozzle cylinder inserted into the exhaust passage in the exhaust duct 23 while being kept sealed, which is mounted on a distal end thereof with the oxidizing agent duct 24. The outer nozzle cylinder 27 is provided therein with an inner nozzle-cylinder 28 in a manner to be concentric therewith, so that an oxidizing agent feed passage 29 is defined between the outer nozzle cylinder 27 and the inner nozzle cylinder 28. The outer nozzle cylinder 27 is fixedly mounted at a distal or front end thereof with a cylindrical stopper member 30, to which one end of the inner nozzle cylinder 28 is joined by welding. The outer nozzle cylinder 27 has an end cap 31 fixed to a rear end thereof, to which the other end of the inner nozzle cylinder 28 is connected by welding. Also, the outer nozzle cylinder 27 is formed at the distal end thereof with three communication holes 32 in a manner to be spaced from each other by angular intervals of 120 degrees in a circumferential direction thereof. In FIG. 1, only one such communication hole 32 is shown for the sake of brevity. The oxidizing agent duct 24 comprises three oxidizing agent duct sections 24a arranged in a manner to be split from each other and in correspondence to the three communication holes 32. The oxidizing agent duct sections 24a each have an oxidizing agent nozzle 33 fixed to a distal end thereof.

The oxidizing agent nozzle 33, as shown in FIG. 3, includes three cylindrical portions 33a arranged in correspondence to each of the oxidizing agent duct sections 24a and a connection portion 33b for connecting the cylindrical portions 33a to each other therethrough. The cylindrical portions 33a each have a bellows 34 of a cylindrical shape arranged therein. The bellows 34 is fixedly mounted at one end thereof on an open end of the oxidizing agent duct portion 24a. The bellows 34 has an annular seal member 35 fixed at a distal end thereof. The seal member 35 is adapted to be rotated while being contacted with an end surface of the regenerative unit 9.

The spool 9a of the regenerative unit 9 has an end to which a seal fixing cylindrical member 36 is fixed at one end thereof. The cylindrical member 36 is arranged so as to extend at the one end thereof into the connection portion 33b of the oxidizing agent nozzle 33 and terminate at the other end thereof in the cylindrical stopper member 30. The cylindrical member 36 is formed at the other end thereof with a flange, to which a seal member 37 comprising a metal bellows is fixed at one end thereof. The seal member 37 is contacted with the flange of the stopper member 30 to prevent exhaust gas which enters the stopper member 30 along the burner nozzle 15 from leaking through a gap between the connection portion 33b of the oxidizing agent nozzle 33 and the cylindrical member 36.

The heat exchanger of the illustrated embodiment further includes rotation support mechanisms 38 and 39 for rotatably supporting the outer nozzle cylinder 27. The rotation support mechanisms 38 and 39 are fixedly supported on four rods 40 mounted on the end plate 23d of the exhaust duct 23 so as to surround the outer nozzle cylinder 27. The rods 40 are arranged so as to define a square by cooperation with each other and the outer nozzle cylinder 27 is positioned at a center of the square. The rotation support mechanisms 38 and 39 include rollers 38b and 38b mounted on four arms 38a and 39a, respectively. The arms 38a and 39a each are fixed at a proximal end thereof on each of the rods 40 and extend at a distal end thereof toward the outer nozzle cylinder 27 and the rotation rollers each are fixed at the distal end of each of the arms.

The outer nozzle cylinder 27 is formed at a portion thereof positioned between the rotation support mechanisms 38 and 39 with at least one air inlet 27a through which the oxidizing agent is introduced into the cylinder 27. A packing holding member 41 is arranged so as to surround the above-described portion of the outer nozzle cylinder 27 between the rotation support mechanisms 38 and 39. The packing holding member 41 is provided therein with two packings 42 and 43, which are positioned on either side of the air inlet 27a for keeping an oxidizing agent inlet space 41a formed around the air inlet 27a air-tight. The outer nozzle cylinder 27 is rotated in the packing holding member 41 and the packing holding member 41 is fixedly mounted on two of the rods 40. The packing holding member 41 is fixedly mounted thereon with an oxidizing agent intake cylinder 44 communicating with the oxidizing agent inlet space 41a.

The four rods 40 are commonly mounted at an end thereof with a mounting plate 45, which is mounted at a lower end thereof with a driving motor 46. The motor 46 includes an output shaft which is mounted thereon with a sprocket 47. The sprocket 47 has a chain 48 wound thereon, which is then wound on a sprocket 49 fixed on an end cap 31 fitted on an end of the outer nozzle cylinder 27. Thus, driving of the motor permits driving force thereof to be transmitted to the outer nozzle cylinder 27, resulting in the outer nozzle cylinder 27 being rotated. The motor 46, sprockets 47, chain 48, sprocket 49, and rotation support mechanisms 38 and 39 cooperate with each other to provide a rotation mechanism which permits relative rotation to occur between the oxidizing agent passage and exhaust passage of the suction/exhaust duct mechanism 22 and the regenerative structure. The end cap 31 has a stopper member 50 loosely fitted thereon. The stopper member 50 is arranged between an annular projection 31a provided on an outer periphery of the end cap 31 and a stopper ring 51 fixedly fitted on the end cap 31 and is provided at a distal end thereof with an abutment member 50a, which is abutted against a corresponding abutment provided on the mounting member 4, to thereby regulate or limit movement of the outer nozzle cylinder 27 toward the regenerator.

The mounting plate 45 is fixedly mounted at a center of an upper portion thereof with a threaded rod 52 which is formed at a distal end thereof with threads. The rod 52 is arranged so as to extend in parallel to the burner nozzle 15 and threadedly fitted thereon with a threaded member 53. The threaded member 53 is rotatably held on one end of an arm member 54 which is fixedly mounted at the other end thereof on the fuel pipe 18 of the burner nozzle 15. Rotation of the threaded member 53 permits a position of the burner nozzle 15 in an axial direction thereof to be adjusted.

Now, the manner of operation of the combustion device 1 constructed as described above will be described hereinafter.

First, combustion air acting as the oxidizing agent is fed from the oxidizing agent duct 24 through the communication holes of the regenerator 8 to the radiation section 101 (FIG. 1) while keeping the fan unit operated. The combustion air fed to the radiation section 101 is then mixed with fuel injected from the burner nozzle 15 and ignited by a pilot flame, to thereby form a flame. The combustion air is heated by exhaust gas of an elevated temperature while passing through the through-holes of the regenerator 8. During combustion, the oxidizing agent duct 24 is kept rotated at a predetermined rotational speed through the motor 46. More specifically, the oxidizing agent duct 24 is kept rotated at a rotational speed of 2 rpm or more. A portion of the regenerator 8 which is reduced in temperature due to rotation of the oxidizing agent duct 24 is heated again by exhaust gas of an elevated temperature flowing from the radiation section to the exhaust duct 23.

In FIG. 1, two such combustion devices 1 are illustrated by way of example, Actually, three or more such combustion devices are often incorporated in the pipestill heater depending on a size of the heater. In the illustrated embodiment, one forced draft fan 111 and one induced draft fan 118 are commonly arranged for a plurality of the combustion devices 1. The forced draft fan 111 has an air discharge port connected to the air intake cylinder 44 of each of the combustion devices 1 through an air side connection line 112. Also, the forced draft fan 111 has an air suction port connected to an oxidizing agent feed line 114 through a flow control valve 113. The oxidizing agent feed line 114 is also connected to a silencer 115.

Reference numeral 116 designates an exhaust side connection line, which is provided at one end thereof with a plurality of branch pipes each connected to each of the exhaust outlets 23f constituting a part of the exhaust passages of the combustion devices 1. To the exhaust side connection line 116 is connected a gas suction port of the induced draft fan 118 through a flow control valve 117. The induced draft fan 118 also has a gas discharge port connected through a line 119 to a flue formed at a discharge end of a gas discharge path 109 arranged on a downstream side of a convection section 102.

The radiation section 101 is provided therein with a heating tube path 105, which has a tube 106 constituting an outlet. The tube 106 is provided thereon with a temperature sensor 120 for detecting a tube wall temperature of the tube 106. Manual combustion control may be carried out in a manner to adjust the flow control valve 117 while observing a temperature detected by the temperature sensor 120 and displayed on a display device arranged on a control panel (not shown). Automatic combustion control may be carried out by automatically adjusting the flow control valve 117 depending on a temperature detected by the temperature sensor 120, as indicated at broken lines in FIG. 1. Alternatively, a flow control valve 126 may be controlled or adjusted while observing a temperature detected by the temperature sensor 120 or automatically adjusted, to thereby carry out control of combustion in the combustion device. This permits exhaust gas to flow through both the gas discharge path 109 and the exhaust passage of each of the combustion devices 1 or the exhaust side connection line 116 and a ratio between the amount of exhaust gas flowing through the gas discharge path 109 and that flowing through the exhaust passage to be determined so that a tube wall temperature (maximum tube wall temperature) at the outlet of the heating tube path 105 is reduced to a level below a heating tube design temperature.

The flow control valve 113 is controlled depending on an output of an oxygen sensor 122 by a valve control unit 121 so that an oxygen concentration in the radiation section 101 is at a predetermined level. Normally, the control is carried out so that an oxygen concentration in the radiation section 101 is between 1.5% and 2.0%. When an oxidation catalyst is carried on the regenerator 8 to reduce a concentration of CO in exhaust gas to an allowable level, the control may be carried out to keep the oxygen concentration at a level between 0.5% and 3.4%.

Exhaust gas sucked out by the induced draft fan 118 is outwardly discharged through the exhaust line 119 to the flue arranged at the discharge end of the gas discharge path 109 without passing through a convection section 102. In the illustrated embodiment, a pressure sensor 123, a control section 124 of the flow control valve (damper) 126 and a valve control unit 125 are arranged for the purpose of constantly controlling a pressure in the radiation section 101. The pressure sensor 123 detects a pressure in the radiation section 101 and the valve control unit 125 controls the flow control valve 126 arranged on the gas discharge path so that a pressure detected by the pressure sensor 123 is within a predetermined range. In general, the control is carried out so as to permit a pressure in the radiation section 101 to be $-2$ mmH$_2$O.

The following description will be made on the pipestill heater of the illustrated embodiment constructed so as to exhibit the following performance:

Design absorbed duty: $1.70 \times 10^6$ kcal/H

Fluid inlet temperature/outlet temperature: 300°/310° C.

Fuel: Refinery gas

Heat efficiency: 78% (Prior to arrangement of the combustion devices of the present invention)

Heating tube material: Carbon steel

Allowable average flux: 27,000 kcal/m$^2$H

Heating tube design temperature: 375° C.

Figure 4:
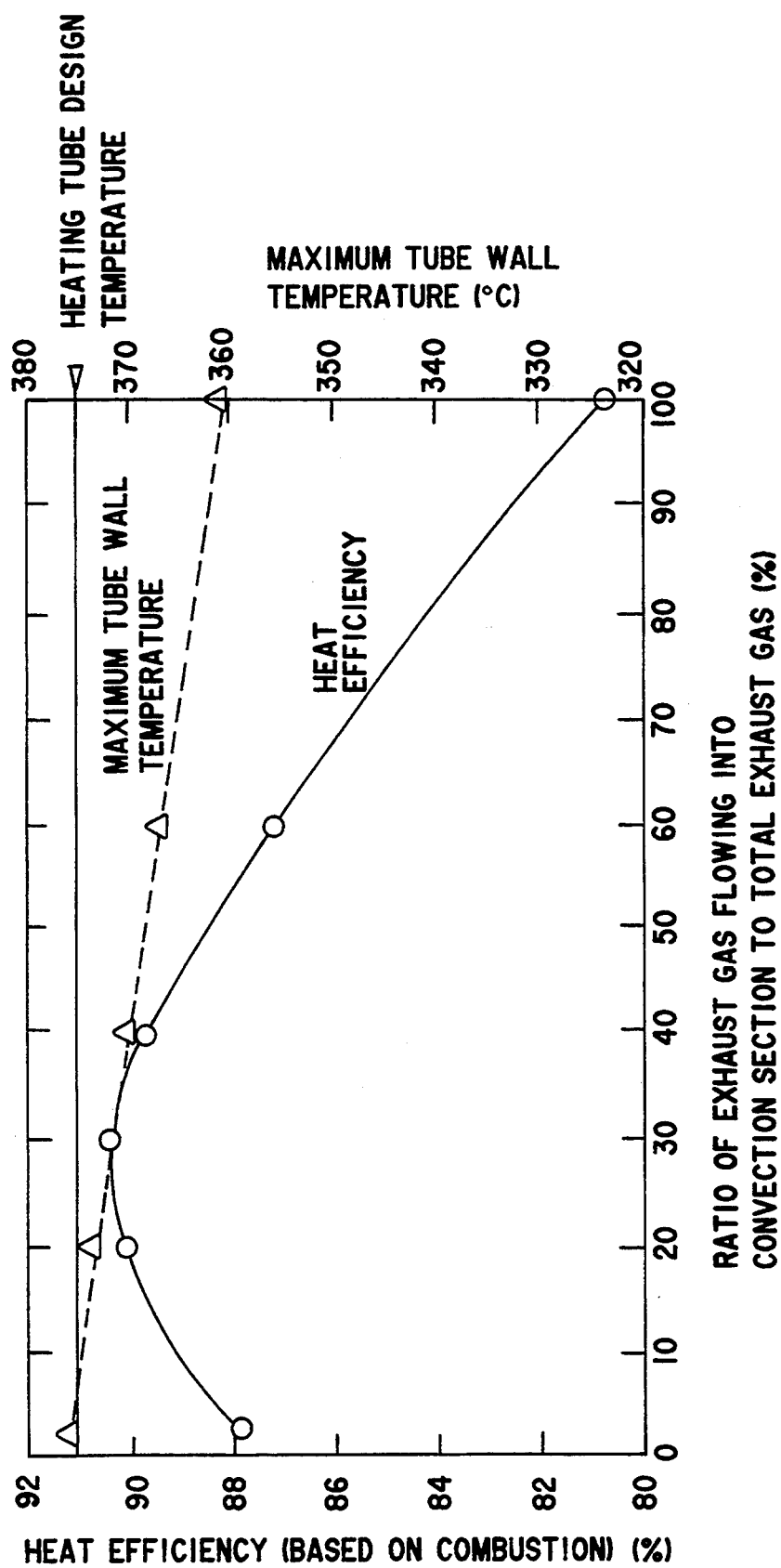
FIG. 4 is a graphical representation showing relationship between a ratio of the amount of exhaust flowing through a convection section to total exhaust gas and heat efficiency, as well as relationship between the ratio and a maximum tube wall temperature of a heating tube path.
Figure 6A:
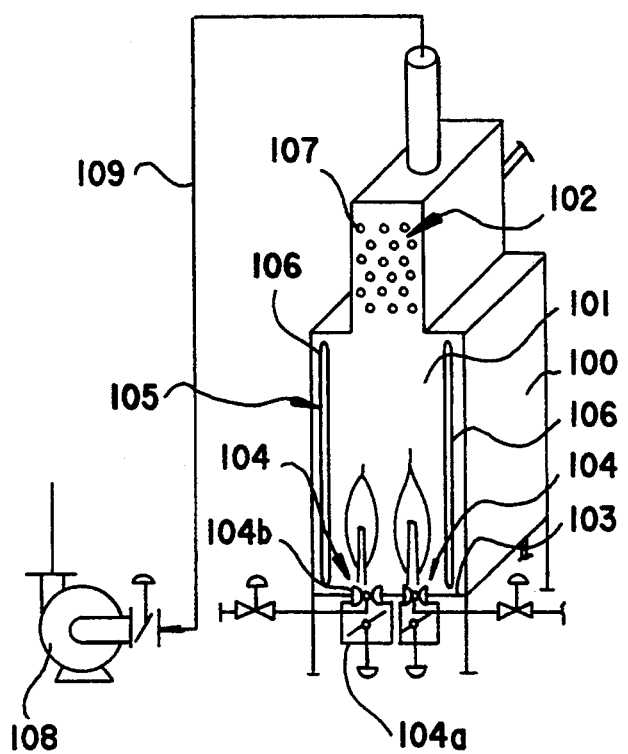
FIG. 6(A) is a perspective view showing a conventional pipestill heater.
Figure 6B:
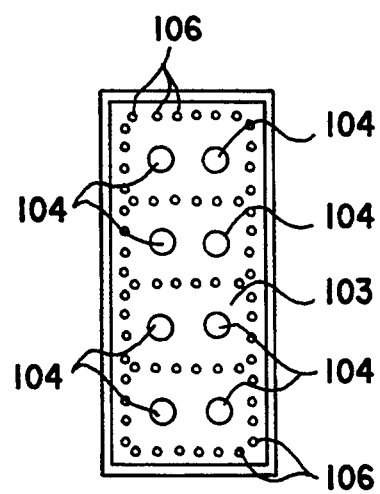
FIG. 6(B) is a schematic view showing arrangement of heating tubes and a combustion device in the conventional pipestill heater of FIG. 6(A).

In connection with the pipestill heater, relationship between a ratio of the amount of exhaust gas flowing through the convection section 102 to the total amount of exhaust gas (the sum of exhaust gas flowing through the convection section 102 and that flowing through the exhaust passage of each of the combustion devices 1) and relationship between a variation in heat efficiency and the tube wall temperature (maximum tube wall temperature) at the output of the heating tube path 105 were obtained by simulation. The results were as shown in FIG. 4. As will be noted from FIG. 4, when a ratio of exhaust gas flowing through the convection section 102 to total exhaust gas is 10% or more, the maximum tube wall temperature is permitted to be below the heating tube design temperature. Also, setting of the ratio at a suitable value (for example, 30%) permits the heat efficiency to be maximum. Comparison between the conventional pipestill heater using the combustion devices free of any heat exchanger for preheating an oxidizing agent and the pipestill heater of the illustrated embodiment indicates that the illustrated embodiment is increased in heat efficiency by 10% or more as compared with the prior art supposing that the amount of combustion of the burner is kept constant.

In actual combustion control, the amount of exhaust gas flowing through the convection section 102 and that flowing through the exhaust passages of the combustion devices are determined so as to prevent the maximum tube wall temperature from being at a level of the heating tube design temperature or below and permit the heat efficiency to approach the maximum one as much as possible. In the pipestill heater operated under the above-described conditions, a ratio of the amount of exhaust gas flowing through the gas discharge path (convention section 102) and that flowing through the exhaust passage is preferably within a range between 2:8 and 4:6. Such a range generally permits the pipestill heater to exhibit a satisfactory function irrespective of operating conditions thereof.

In the illustrated embodiment, the regenerator 8 is separated into the high temperature section 10 made of a ceramic material and the low temperature section 9 made of a metal material. However, the regenerator is not limited to such construction and materials. In the illustrated embodiment, the combustion devices each are constructed so that the burner nozzle is arranged in a manner to pass through the center of the heat exchanger. Such construction permits mounting of the combustion device to be carried out directly using a mounting hole formed at a furnace floor of the existing pipestill heater.

Nevertheless, the heat recovery type combustion device which may be utilized in the present invention is limited to any specific construction so long as it includes a combination of a burner and a heat exchanger of a specific structure. For example, such a heat recovery type combustion apparatus as disclosed in U.S. Pat. No. 4,856,492, Japanese Patent Application Laid-Open Publication No. 159511/1989 and Japanese Patent Application Laid-Open Publication No. 256423/1993 may be conveniently used. The combustion apparatus disclosed includes a combination of a heat exchanger and a burner, wherein the heat exchanger is constructed in such a manner that two or more regenerators are arranged in two passages each acting as an exhaust passage or an oxidizing agent passage, wherein the regenerator in one of the passages is heated by exhaust gas and an oxidizing agent is fed through the regenerator in the other passage heated by exhaust gas to a furnace.

Figure 5A:
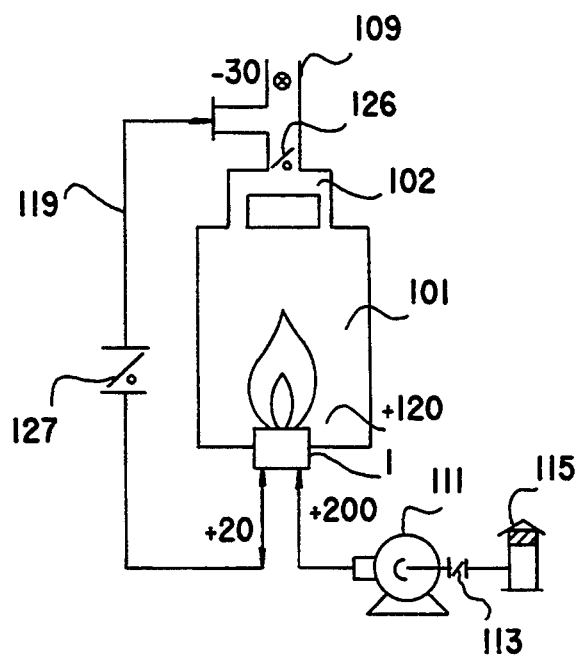
FIGS. 5(A) and 5(B) each are a schematic diagrammatic view showing a modification of the present invention.
Figure 5B:
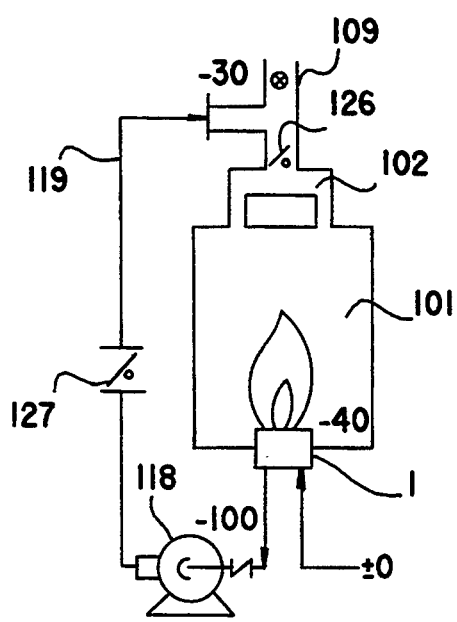

In the illustrated embodiment, the fans 111 and 118 separate from each other are used for feed of an oxidizing agent and discharge of exhaust gas, respectively. Alternatively, the feed and discharge may be carried out by means of a common fan. For example, a modification shown in FIG. 5(A) is so constructed that a forced draft fan 111 is arranged in an oxidizing passage of a combustion device for feed of an oxidizing agent. An exhaust passage is connected through an exhaust line 119 to a downstream side of a gas discharge path 109. Control valves 126 and 127 are controlled so as to keep a pressure in a radiation section 101 positive. Numerical values in FIG. 5(A) each indicate a pressure (mmH$_2$O) at each of parts of the modification. In a modification shown in FIG. 5(B), only an induced draft fan 118 for inducing exhaust gas from an exhaust passage of a combustion device is provided. The induced draft fan 118 is connected at a discharge port thereof through an exhaust line 119 to a downstream side of a gas discharge path 109. Control valves 126 and 127 are adjusted so as to render a pressure in a radiation section 101 negative. Numerical values in FIG. 5(B) each likewise indicate a pressure (mmH$_2$O) at each of parts of the modification. The modifications each permit the number of fans required to be reduced to one half.

In the illustrated embodiment, the combustion device 1 is arranged on the furnace floor 103. However, when the present invention is applied to a box-type horizontal pipestill heater, the burner of the combustion device may be conveniently arranged on a side furnace wall of the radiation section.

As can be seen from the foregoing, the present invention has the heat recovery type combustion apparatus including a combination of the heat exchanger and burner incorporated therein, to thereby eliminate a necessity of arranging a large-sized and expensive oxidizing agent preheating unit and increase heat efficiency. Also, the present invention is constructed in the manner that exhaust gas flows through both the gas discharge path and exhaust passage and a ratio between the amount of exhaust gas flowing through the gas discharge path and that flowing through the exhaust passage is determined so as to permit the tube wall temperature at the outlet of the heating tube path to be below the heating tube design temperature. Such construction accomplishes preheating of exhaust gas at the convection section and reduces a temperature in the radiation section. Thus, application of the present invention to the existing pipestill heater is satisfactorily accomplished while effectively preventing deterioration in durability of the heater and occurrence of coking when hydrocarbon is used as process fluid.

While preferred embodiments of the invention have been described with a certain degree of particularity with reference to the drawings, obvious modifications and variations are possible in light of the above teachings. It is therefore to be understood that with the scope of the appended claims, the invention may be practiced otherwise than as specifically described.

What is claimed is:

1. A method for controlling combustion in a pipestill heater including a radiation section including a furnace wall and arranged for heating process fluid flowing through a heating tube path arranged therein mainly by radiative heat transfer, at least one combustion device arranged on the furnace wall of the radiation section, a convection section having a preheating tube path arranged therein and connected to the heating tube path for preheating the process fluid flowing through the preheating tube path by exhaust gas discharged from the combustion device, and a gas discharge path for discharging exhaust gas passing through the convection section, comprising the steps of:

using a heat recovery type combustion apparatus as said combustion device;

said heat recovery type combustion apparatus including a heat exchanger and a burner;

said heat exchanger including at least one air-pervious regenerator, an oxidizing agent passage for feeding an oxidizing agent through at least a part of said regenerator to said radiation section, and an exhaust passage for discharging a part of exhaust gas discharged from said radiation section through at least a part of said regenerator, to thereby heat said regenerator by a part of the exhaust gas, resulting in preheating the oxidizing agent by the regenerator thus heated;

flowing the exhaust gas through both said gas discharge path and exhaust passage; and determining a ratio between the amount of exhaust gas flowing through said gas discharge path and the amount of exhaust gas flowing through said exhaust passage of said combustion device so that a maximum tube wall temperature of said heating tube path is below a heating tube design temperature.

2. A method as defined in claim 1, wherein said heat exchanger comprises:

said regenerator formed with a plurality of communication paths for permitting said radiation section and an outside of said radiation section to communicate with each other and mounted on said furnace wall of said radiation section;

a duct structure formed with said oxidizing agent passage through which the oxidizing agent is flowed and said exhaust passage through which the exhaust gas is flowed and arranged for feeding the oxidizing agent from an end of said regenerator opposite to said radiation section through a part of said plurality of communication paths into said radiation section and discharging exhaust gas from said end of said regenerator through the remaining part of said plurality of communication paths; and a rotation mechanism for carrying out relative rotation between said regenerator and said oxidizing agent passage and exhaust passage.

3. A method as defined in claim 2, wherein said burner has a tip end provided so as to extend through a central portion of said regenerator.

4. A method as defined in claim 1, wherein said maximum tube wall temperature of said heating tube path is determined by measuring a temperature of a wall of an outlet tube of said heating tube path.

5. A method as defined in claim 1, further comprising a flow control valve arranged at said exhaust passage for controlling a flow rate of exhaust gas discharged from said exhaust passage;

said flow control valve being controlled depending on said maximum wall tube temperature of said heating tube path.

6. A method as defined in claim 1 or 2, wherein said exhaust passage of said combustion device communicates with a downstream side of said gas discharge path; and said oxidizing agent is fed to said oxidizing agent passage by means of a forced draft fan so as to keep a pressure in said radiation section positive.

7. A method as defined in claim 1 or 2, wherein said exhaust gas passage of said combustion device communicates with a downstream side of said gas discharge path;

said exhaust gas being induced through said exhaust passage by means of an induced draft fan so as to keep a pressure in said radiation section negative.

8. A method as defined in claim 2, wherein said relative rotation between said regenerator and said oxidizing agent passage and exhaust passage is carried out at a speed of 2 rpm or more.

9. A method as defined in claim 2, wherein said duct structure is so constructed that said oxidizing agent passage is rotated in said exhaust passage;

said oxidizing agent passage being rotated at a speed of 2 to 4 rpm or more.

10. A method as defined in claim 1 or 2, wherein said oxidizing agent comprises oxygen; and said oxidizing agent is forced through said oxidizing agent passage at a flow rate which is controlled so as to permit an oxygen concentration in said radiation section to be between 0.5% and 3.4%.

11. A method as defined in claim 1 or 2, further comprising the step of detecting a pressure in said radiation section; and controlling a flow rate of the exhaust gas discharged through said gas discharge path so that a pressure in said radiation section is within a predetermined range.

12. A method as defined in claim 1 or 2, wherein the amount of the exhaust gas flowing through said convection section and that flowing through said exhaust passage is within a range of 2:8 to 4:6.

13. A pipestill heater comprising:

a radiation section including a furnace wall and arranged for heating process fluid flowing through a heating tube path arranged therein mainly by radiative heat transfer;

at least one combustion device arranged on said furnace wall of said radiation section;

a convection section having a preheating tube path arranged therein and connected to said heating tube path for preheating the process fluid flowing through said preheating tube path by exhaust gas discharged from said combustion device; and a gas discharge path for discharging the exhaust gas passing through said convection section;

said combustion device including a heat recovery type combustion apparatus constructed of a combination of a burner and a heat exchanger for preheating an oxidizing agent fed to said burner by means of exhaust gas;

said heat exchanger including at least one air-pervious regenerator, an oxidizing agent passage for feeding an oxidizing agent through at least a part of said regenerator to said radiation section, and an exhaust passage for discharging a part of exhaust gas discharged from said radiation section through at least a part of said regenerator and constructed so as to heat said regenerator by a part of the exhaust gas, to thereby preheat the oxidizing agent by the regenerator thus heated; and a fan unit for flowing the oxidizing agent through said oxidizing agent passage and flowing exhaust gas through both said gas discharge path and said exhaust passage of said combustion device;

said fan unit determining a ratio between the amount of exhaust gas flowing through said gas discharge path and the amount of exhaust gas flowing through said exhaust passage of said combustion device so that a maximum tube wall temperature of the heating tube path is below a heating tube design temperature.

14. A pipestill heater as defined in claim 13, wherein said heat exchanger comprises:

said regenerator formed with a plurality of communication paths for permitting said radiation section and an outside of said radiation section to communicate with each other and mounted on said furnace floor of said radiation section;

a duct structure formed with said oxidizing agent passage through which the oxidizing agent is flowed and said exhaust passage through which the exhaust gas is flowed and arranged for feeding the oxidizing agent from an end of said regenerator opposite to said radiation section through a part of said plurality of communication paths into said radiation section and discharging exhaust gas from said end of said regenerator through the remaining part of said plurality of communication paths; and a rotation mechanism for carrying out relative rotation between said regenerator and said oxidizing agent passage and exhaust passage.

15. A pipestill heater as defined in claim 14, wherein said burner has a tip end provided so as to extend through a central portion of said regenerator.

16. A pipestill heater as defined in claim 13, wherein said heating tube path is provided at an output tube portion thereof with a temperature sensor for measuring said maximum tube wall temperature of said heating tube path.

17. A pipestill heater as defined in claim 16, wherein said fan unit includes an induced draft fan for inducing exhaust gas from said exhaust passage through a first flow control valve and a forced draft fan for forcing the oxidizing agent through a second flow control valve to said oxidizing agent passage; and a third flow control valve is arranged in said gas discharge path so as to control exhaust gas discharged from said convection section;

at least one of said first flow control valve and third flow control valve being controlled depending on an output of said temperature sensor.

18. A pipestill heater as defined in claim 17, wherein said oxidizing agent comprises oxygen;

an oxygen sensor is arranged for detecting an oxygen concentration in said radiation section; and said second flow control valve being controlled so that the oxidizing agent is forced through said oxidizing agent passage at a flow rate which permits an oxygen concentration in said radiation section to be between 0.5% and 3.4%.

19. A pipestill heater as defined in claim 13 or 14, wherein said fan unit comprises a forced draft fan for feeding the oxidizing agent to said oxidizing agent passage so as to keep a pressure in said radiation section positive.

20. A pipestill heater as defined in claim 13 or 14, wherein said fan unit comprises an induced draft fan for inducing exhaust gas through said exhaust passage so as to keep a pressure in said radiation section negative.

* * * * *